US011876326B2

(12) United States Patent
Yang et al.

(10) Patent No.: US 11,876,326 B2
(45) Date of Patent: Jan. 16, 2024

(54) HIGH-VOLTAGE CONNECTOR AND ELECTROMAGNETIC SHIELDING SHELL FOR HIGH-VOLTAGE CONNECTOR

(71) Applicant: TYCO ELECTRONICS (SHANGHAI) CO., LTD., Shanghai (CN)

(72) Inventors: Yuchen Yang, Shanghai (CN); Mengyu Zhang, Shanghai (CN); Jianxiong Li, Shanghai (CN); Kaixuan (Evan) Jiang, Shanghai (CN); Haomai (Ivan) Yin, Shanghai (CN); Xiao (Nichee) Zhou, Shanghai (CN)

(73) Assignee: TYCO ELECTRONICS (SHANGHAI) CO., LTD., Shanghai (CN)

( * ) Notice: Subject to any disclaimer, the term of this patent is extended or adjusted under 35 U.S.C. 154(b) by 163 days.

(21) Appl. No.: 17/511,727

(22) Filed: Oct. 27, 2021

(65) Prior Publication Data

US 2022/0140541 A1 May 5, 2022

(30) Foreign Application Priority Data

Oct. 30, 2020 (CN) ......................... 202022480193.9

(51) Int. Cl.
*H01R 13/6582* (2011.01)
*H01R 13/24* (2006.01)
(Continued)

(52) U.S. Cl.
CPC ..... *H01R 13/6582* (2013.01); *H01R 13/2407* (2013.01); *H01R 13/502* (2013.01); *H01R 13/53* (2013.01); *H01R 13/6585* (2013.01)

(58) Field of Classification Search
CPC ................ H01R 13/6582; H01R 13/53; H01R 13/6585; H01R 13/502; H01R 13/2407
(Continued)

(56) References Cited

U.S. PATENT DOCUMENTS 3,086,190 A * 4/1963 Neidecker .............. H01R 13/33 439/631
3,400,358 A * 9/1968 Byrnes ................... H01R 13/33 439/825

(Continued)

*Primary Examiner* — Gary F Paumen
(74) *Attorney, Agent, or Firm* — Potomac Law Group, PLLC

(57) ABSTRACT

The present application provides a high-voltage connector and an electromagnetic shielding shell for a high-voltage connector, the electromagnetic shielding shell has a main body; a connecting body; and a plurality of elastic arms, arranged at intervals between the main body and the connecting body; an end of each of the elastic arms is connected to the main body, and the other end of each of the elastic arms is connected to the connecting body, each of the elastic arms is provided with a protrusion protruding in a radial direction, and the protrusion is configured for electrically contacting a shielding member of a mating connector. The electromagnetic shielding shell has the elastic arms arranged between the main body of the electromagnetic shielding shell and the connecting body, so that both ends of the elastic arms are connected with the electromagnetic shielding shell itself, and when the shielding current flows through the protrusions of the elastic arms, the shielding current can communicate to the main body and the connecting body respectively through two ends of each elastic arm, so that the shielding current does not fold back geometrically, and the shielding current path is smooth, which is beneficial to reduce the loop resistance of the electromagnetic shielding shell and improve the electromagnetic shielding effect.

14 Claims, 1 Drawing Sheet

(51) Int. Cl.

| | |
|---|---|
| ***H01R 13/502*** | (2006.01) |
| ***H01R 13/53*** | (2006.01) |
| ***H01R 13/6585*** | (2011.01) |

(58) Field of Classification Search
USPC ........................ 439/825–827, 607.01, 607.17
See application file for complete search history.

(56) References Cited

U.S. PATENT DOCUMENTS

| | | | | |
|---|---|---|---|---|
| 4,080,033 | A * | 3/1978 | Deal .................... | H01R 13/187 439/931 |
| 5,358,432 | A * | 10/1994 | Shih ......................... | H02K 3/51 439/825 |
| 5,695,357 | A * | 12/1997 | Wright ..................... | H01R 4/50 439/825 |
| 7,731,549 | B2 * | 6/2010 | Metzler .................. | H01R 24/58 439/825 |
| 2009/0269993 | A1 * | 10/2009 | Zhang .................... | H01R 13/17 439/825 |
| 2013/0244506 | A1 * | 9/2013 | Endo .................... | H01R 13/055 439/825 |

* cited by examiner

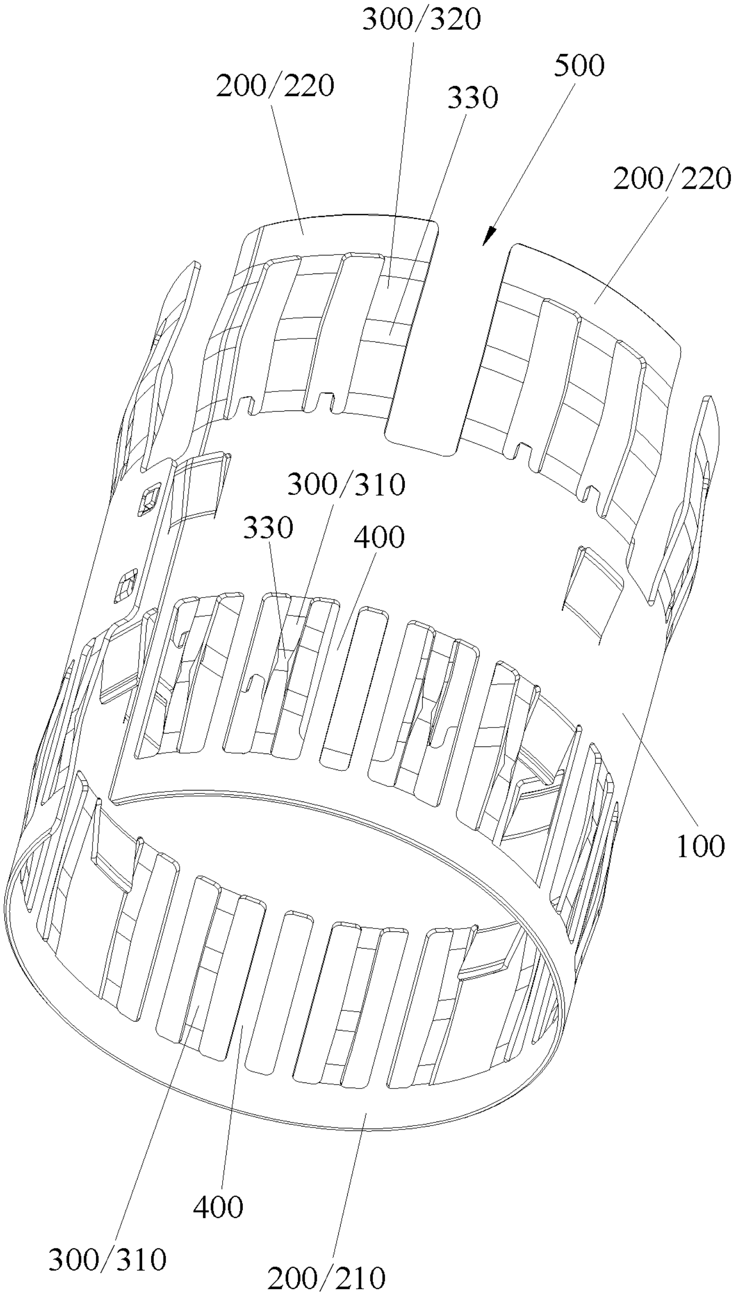
300/320
200/220
330
500
200/220
300/310
330
400
100
400
300/310
200/210

HIGH-VOLTAGE CONNECTOR AND ELECTROMAGNETIC SHIELDING SHELL FOR HIGH-VOLTAGE CONNECTOR

TECHNICAL FIELD

The present application relates to the technical field of connector, and more particularly to a high-voltage connector and an electromagnetic shielding shell for the high-voltage connector.

BACKGROUND OF INVENTION

The electromagnetic shielding shell of the existing high-voltage connector for automobiles needs to communicate the shielding signal and current on the mating connector through a plurality of contact springs. The structure of the contact springs greatly affects the shielding performance of the electromagnetic shielding shell. In the structure of the electromagnetic shielding shell in the past, the contact spring is generally formed by folding backwards, when the shielding current flows through the contact spring, it needs to be folded back before flowing through, resulting in high loop resistance of the electromagnetic shielding shell and poor electromagnetic shielding effect.

SUMMARY OF INVENTION

An object of the present application is to provide an electromagnetic shielding shell for a high-voltage connector, in order to solve the technical problem of high loop resistance of electromagnetic shielding shell and poor electromagnetic shielding effect in the prior art.

To achieve above object, the technical solution used in the present application is that: an electromagnetic shielding shell for a high-voltage connector is provided and comprises:

- a main body;
- a connecting body; and
- a plurality of elastic arms, arranged at intervals between the main body and the connecting body; an end of each of the elastic arms is connected to the main body, and the other end of each of the elastic arms is connected to the connecting body, each of the elastic arms is provided with a protrusion protruding in a radial direction, and the protrusion is configured for electrically contacting a shielding member of a mating connector.

Optionally, the protrusion protrudes out of an outer surface of the main body.

Optionally, the main body is a ring-shaped structure, and the connecting body is an arc-shaped structure arranged along a circumferential direction of the main body.

Optionally, each of the elastic arms is arranged between the main body and the connecting body along an axial direction of the main body.

Optionally, each of the elastic arms is extended between the main body and the protrusion along an axial direction of the main body.

Optionally, a plurality of connecting arms are provided at intervals between the main body and the connecting body, and an end of each of the connecting arms is connected to the main body, and the other end of each of the connecting arms is connected to the connecting body.

Optionally, each of the connecting arms is a straight structure, and the connecting arms and the shielding member of the mating connector are spaced apart in a radial direction.

Optionally, each of the connecting arms extends between the main body and the connecting body along the axial direction of the main body.

Optionally, the elastic arms and the connecting arms are staggered and distributed between the main body and the connecting body along the circumferential direction of the main body.

Optionally, the elastic arms and the connecting arms are evenly arranged along the circumferential direction of the main body.

Optionally, the connecting body includes a first connecting body and a second connecting body respectively located on two opposite sides of the main body, and the elastic arms include a plurality of first elastic arms and a plurality of second elastic arms; an end of each of the first elastic arms is connected to the main body, and the other end of each of the first elastic arms is connected to the first connecting body; an end of each of the second elastic arms is connected to the main body, and the other end of each of the second elastic arms is connected to the second connecting body.

Optionally, the second connecting body is provided with multiple, and the multiple second connecting bodies are distributed around the axial direction of the main body, a gap is formed between two adjacent second connecting bodies, and a plurality of second elastic arms are arranged between each of the second connecting bodies and the main body.

Optionally, the main body, the elastic arms and the connecting body are arranged in sequence along the axial direction of the main body.

The present application further provides a high-voltage connector, which includes a connector housing and the electromagnetic shielding shell above mentioned; the electromagnetic shielding shell is arranged inside the connector housing; and the connecting body is arranged at a mating end of a mating connector.

The embodiments of the present application have at least the following beneficial effects: the electromagnetic shielding shell has the elastic arms arranged between the main body of the electromagnetic shielding shell and the connecting body, so that both ends of the elastic arms are connected with the electromagnetic shielding shell itself, and when the shielding current flows through the protrusions of the elastic arms, the shielding current can communicate to the main body and the connecting body respectively through two ends of each elastic arm, so that the shielding current does not fold back geometrically, and the shielding current path is smooth, which is beneficial to reduce the loop resistance of the electromagnetic shielding shell and improve the electromagnetic shielding effect.

BRIEF DESCRIPTION OF THE DRAWINGS

In order to more clearly describe the technical solutions in the embodiments of the present application, the following will briefly introduce the drawings needed in the description of the embodiments or the prior art. Obviously, the drawings in the following description are only of the present application. For some embodiments, those of ordinary skill in the art can obtain other drawings based on these drawings without creative labor.

FIG. 1 is a structural schematic view of an electromagnetic shielding shell provided by an embodiment of the present application.

In the Drawing, the reference signs are listed:

100—main body; 200—connecting body; 210—first connecting body; 220—second connecting body; 300—elastic arm; 310—first elastic arm; 320—second elastic arm; 330—protrusion; 400—connecting arm; 500—gap.

DETAILED DESCRIPTION OF EMBODIMENTS

In order to make the technical problems, technical solutions, and beneficial effects to be solved by the present application clearer, the following further describes the present application in detail with reference to the accompanying drawings and embodiments. It should be understood that the specific embodiments described here are only used to explain the present application, and are not used to limit the present application.

It should be noted that when a component is referred to as being "fixed on" or "arranged on" another component, it can be directly on the other component or indirectly on the other component. When a component is said to be "connected" to another component, it can be directly or indirectly connected to the other component. The terms "upper", "lower", "left", "right", etc. indicate the orientation or positional relationship based on the orientation or positional relationship shown in the drawings, and are only for ease of description, and do not indicate or imply the device or the element must have a specific orientation, be constructed and operated in a specific orientation, and therefore cannot be understood as a limitation of the present application. For those skilled in the art, the specific meaning of the above terms can be understood according to specific conditions. The terms "first" and "second" are only used for ease of description, and cannot be understood as indicating or implying relative importance or implicitly indicating the number of technical features. The meaning of "plurality" means two or more than two, unless otherwise specifically defined.

The embodiment of the present application provides an electromagnetic shielding shell for a high-voltage connector, as shown in FIG. 1, which includes the main body 100 and the connecting body 200, a plurality of elastic arms 300 are provided between the main body 100 and the connecting body 200, and an end of each elastic arm 300 is connected to the main body 100, and the other end of each elastic arm 300 is connected to the connecting body 200. Each elastic arm 300 is provided with a protrusion 330 protruding in a radial direction (that is, a direction perpendicular to the axial direction of the main body 100), the protrusions 330 are used for electrically contacting mating connectors.

In the embodiment of the application, the elastic arms 300 are arranged between the main body 100 and the connecting body 200 of the electromagnetic shielding shell, so that the front and rear ends of the elastic arms 300 are connected to the electromagnetic shielding shell itself (the main body 100 and the connecting body 200 belong to parts of the electromagnetic shielding shell), and when the shielding current flows through the protrusions 330 of the elastic arms 300, the shielding current can communicate to the main body 100 and the connecting body 200 respectively through two ends of each elastic arm 300, o that the shielding current does not fold back geometrically, and the shielding current path is smooth, which is beneficial to reduce the loop resistance of the electromagnetic shielding shell and improve the electromagnetic shielding effect.

In one of the embodiments, the protrusion 330 on each elastic arm 300 protrudes from the outer surface of the main body 100 to ensure that the protrusion 330 can make electrical contact with the shielding member of the mating connector.

In one of the embodiments, the main body 100 is a ring-shaped structure, and the connecting body 200 is an arc-shaped structure arranged along a circumferential direction of the main body 100, such that the structure of the electromagnetic shielding shell is simpler and easier to be manufactured, and as well as easier to be assembled to high-voltage connectors and other components.

In one of the embodiments, the elastic arms 300 are arranged between the main body 100 and the connecting body 200 along the axial direction of the main body 100. On the one hand, the shielding space of the electromagnetic shielding shell can be enlarged in the axial direction of the main body 100, and on the other hand, it is beneficial to reduce the resistance of the protrusions 330 on the elastic arms 300 when the electromagnetic shielding shell is assembled into high-voltage connectors and other components.

In one of the embodiments, each elastic arm 300 extends between the main body 100 and the protrusion 330 along the axial direction of the main body 100, which is simple in structure and easy to be assembled.

In one of the embodiments, a plurality of connecting arms 400 are provided at intervals between the main body 100 and the connecting body 200, and an end of each of the connecting arms 400 is connected to the main body 100, and the other end of each of the connecting arms 400 is connected to the connecting body 200. The connecting arms 400 can block and reflect electromagnetic signals, and can assist in flowing of the shielding current, improving the shielding effect; the connecting arms 400 can increase the connection strength between the main body 100 and the connecting body 200, such that the electromagnetic shielding shell difficult to deform during assembly; the increase of the connecting arms 400 can also reduce the requirements of the electromagnetic shielding shell on the thickness and width of the elastic arms 300 as much as possible under the same circumstances, and fully ensure that the structure of the elastic arms 300 can also be arranged at corners and bends, and the electromagnetic shielding effect is ensured. In addition, the structure of the electromagnetic shielding shell can also change the shielding performance and assembly mechanical force of the electromagnetic shielding shell by increasing or decreasing the number and width of the connecting arms 400, or by increasing or decreasing the number and width of the elastic arms 300, so as to meet different requirements of the products.

In one of the embodiments, each connecting arm 400 has a straight structure, and the connecting arms 400 are spaced apart from the shielding members of the mating connector in a radial direction to ensure that the surface of the connecting arms 400 do not directly contact the shielding members of the mating connector.

In one of the embodiments, each connecting arm 400 extends between the main body 100 and the connecting body 200 along the axial direction of the main body 100, which is beneficial to further expand the shielding space of the electromagnetic shielding shell and further improve the structural strength of the electromagnetic shielding shell.

In one of the embodiments, the elastic arms 300 and the connecting arms 400 are staggered and distributed between the main body and the connecting body along the circumferential direction of the main body. When the electromagnetic shielding shell is assembled, the elastic arms 300 and the connecting arms 400 are staggered and distributed, so that the protrusion 330 on each elastic arm 300 can bear the resistance of other parts of the high-voltage connector more evenly; at the same time, the connecting arms 400 and the elastic arms 300 can also bear the squeezing force from the main body 100 and the connecting body 200 more evenly, such that the electromagnetic shielding shell has a higher structural strength.

In one of the embodiments, the elastic arms 300 and the connecting arms 400 are evenly arranged along the circumferential direction of the main body 100 to further improve the structural strength of the electromagnetic shielding shell.

In one of the embodiments, the connecting body 200 includes a first connecting body 210 and a second connecting body 220 respectively located on two opposite sides of the main body 100, and the elastic arms 300 includes a plurality of first elastic arms 310 and a plurality of second elastic arms 320; one end of each first elastic arm 310 is connected to the main body 100, the other end of each first elastic arm 310 is connected to the first connecting body 210, one end of each second elastic arm 320 is connected to the main body 100, and the other end of each second elastic arm 320 is connected to the second connecting body 220. By arranging the first connecting body 210 and the second connecting body 220 on opposite sides of the main body 100, respectively, and the first elastic arms 310 are arranged between the main body 100 and the first connecting body 210, the second elastic arms 320 are arranged between the main body 100 and the second connecting body 220, such that shielding current can flow to the main body 100 and the first connecting body 210 through the protrusions 330 on the first elastic arms 310, and can also flow to the main body 100 and the second connecting body 220 through the protrusions 330 on the second elastic arms 320, which is beneficial to further reduce the loop resistance of the electromagnetic shielding shell and improve the shielding performance of the electromagnetic shielding shell.

In one of the embodiments, the first connecting body 210 is provided as one, and a plurality of first elastic arms 310 are respectively arranged between the main body 100 and the first connecting body 210. The first connecting body 210 is provided as one, and the plurality of first elastic arms 310 are all arranged between the main body 100 and the first connecting body 210, which can improve the structural stability of the first connecting body 210 and the first elastic arms 310, and the first connecting body 210, the main body 100, and the plurality of first elastic arms 310 as a whole are not easily deformed.

In one of the embodiments, a plurality of connecting arms 400 are disposed at intervals between the main body 100 and the first connecting body 210, one end of each connecting arm 400 is connected to the main body 100, and the other end of each connecting arm 400 is connected to the first connecting body 210. Each connecting arm 400 has a flat surface structure, which can also block and reflect electromagnetic signals, and can assist the flow of shielding current, and improve the shielding effect; since only one first connecting body 210 is provided, so that the multiple connecting arms 400 arranged between the first connecting body 210 and the main body 100 can increase the connection strength between the main body 100 and the first connecting body 210, so that the electromagnetic shielding shell is not easily deformed during assembly; the increasing of the connecting arms 400 can also reduce the requirements of the electromagnetic shielding shell on the thickness and width of the first elastic arm 310 as much as possible under the same circumstances, and fully ensure that the structure of the first elastic arm 310 can also be arranged at corners and bends to ensure the electromagnetic shielding effect. In addition, the structure of the electromagnetic shielding shell can also change the shielding performance and assembly mechanical force of the electromagnetic shielding shell by increasing or decreasing the number and width of the connecting arms 400 or by increasing or decreasing the number and width of the first elastic arms 310 to meet different product requirements.

In one of the embodiments, the connecting arms 400 extend along the axial direction of the main body 100. The extending directions of the connecting arms 400 and the first elastic arm s310 are both the axial direction of the main body 100, which is beneficial to further expand the shielding space of the electromagnetic shielding shell and further improve the structural strength of the electromagnetic shielding shell.

In one of the embodiments, the first elastic arms 310 and the connecting arms 400 are staggered and distributed between the main body 100 and the first connecting body 210. When the electromagnetic shielding shell is assembled, the first elastic arms 310 and the connecting arms 400 are staggered and distributed, so that the protrusion 330 on each first elastic arm 310 can more evenly withstand the resistance of other parts of the high-voltage connector; at the same time, each connecting arm 400, each first elastic arm 310 can also bear the squeezing force from the main body 100 and the first connecting body 210 more evenly, so that the electromagnetic shielding shell has a higher structural strength.

In one of the embodiments, the second connecting body 220 is provided as multiple, and the multiple second connecting bodies 220 are distributed around the axial direction of the main body 100, and a gap 500 is formed between two adjacent second connecting bodies 220. A plurality of the second elastic arms 320 are arranged between each of the second connecting body 220 and the main body 100. Compared with the structure of the first connecting body 210 and the first elastic arms 310, the structural stability of the second connecting bodies 220 and the second elastic arms 320 is not as good as that of the first connecting body 210 and the first elastic arms 310, because the gap 500 is formed between the two adjacent second connecting bodies 220, and the multiple second connecting bodies 220 are not connected to form a whole structure; however, the second connecting body 220 is provided as multiple, and there is a gap 500 between two adjacent second connecting bodies 220, and a plurality of second elastic arms 320 are respectively arranged between the multiple second connecting bodies 220 and the main body 100. The advantage is that it can quickly identify which side of the electromagnetic shielding shell is the first elastic arm 310, and which side is the second elastic arm 320 during assembly, so that the first elastic arms 310 and the second elastic arms 320 can be accurately assembled to the corresponding positions of the high-voltage connector and other components, so as to prevent the electromagnetic shielding shell from being reversed in the front and rear directions. In addition, the structure of the electromagnetic shielding shell can also change the shielding performance and assembly mechanical force of the electromagnetic shielding shell by increasing or decreasing the number and width of the second elastic arms 320 to meet different product requirements.

In one of the embodiments, the main body 100, the connecting body 200, and the elastic arms 300 are integrally formed, which makes the manufacturing process of the electromagnetic shielding shell simpler and has higher structural stability.

In one of the embodiments, the main body 100, the elastic arms 300, and the connecting body 200 are arranged in sequence along the axial direction of the main body 100.

The embodiment of the present application also provides a high-voltage connector, which includes a connector housing (not shown in the FIGURE) and an electromagnetic shielding shell as described above, the electromagnetic shielding shell is arranged inside the connector housing, and the connecting body 200 is arranged on the mating end of the mating connector enables the high-voltage connector to have a higher electromagnetic shielding effect on the internal electromagnetic signals.

The above are only some embodiments of the present application and are not intended to limit the present application, and any modification, equivalent replacement and improvement made within the spirit and principle of the present application shall within in the protection scope of the present application.

What is claimed is:

1. An electromagnetic shielding shell for a high-voltage connector, comprising:
- a main body;
- a connecting body;
- a plurality of elastic arms, arranged at intervals between the main body and the connecting body;
- a plurality of connecting arms provided at intervals between the main body and the connecting body;
- wherein an end of each of the elastic arms is connected to the main body, and the other end of each of the elastic arms is connected to the connecting body, each of the elastic arms is provided with a protrusion protruding in a radial direction, and the protrusion is configured for electrically contacting a shielding member of a mating connector;
- wherein an end of each of the connecting arms is connected to the main body, and the other end of each of the connecting arms is connected to the connecting body, the connecting arms are planar wherein the connecting arms do not engage the shielding member of the mating connector.

2. The electromagnetic shielding shell according to claim 1, wherein the protrusion protrudes out of an outer surface of the main body.

3. The electromagnetic shielding shell according to claim 1, wherein the main body is a ring-shaped structure, and the connecting body is an arc-shaped structure arranged along a circumferential direction of the main body.

4. The electromagnetic shielding shell according to claim 3, wherein each of the elastic arms is arranged between the main body and the connecting body along an axial direction of the main body.

5. The electromagnetic shielding shell according to claim 3, wherein each of the elastic arms is extended between the main body and the protrusion along an axial direction of the main body.

6. The electromagnetic shielding shell according to claim 1, wherein each of the connecting arms is a straight structure, and the connecting arms and the shielding member of the mating connector are spaced apart in a radial direction.

7. The electromagnetic shielding shell according to claim 1, wherein each of the connecting arms extends between the main body and the connecting body along the axial direction of the main body.

8. The electromagnetic shielding shell according to claim 1, wherein the elastic arms and the connecting arms are staggered and distributed between the main body and the connecting body along the circumferential direction of the main body.

9. The electromagnetic shielding shell according to claim 1, wherein the elastic arms and the connecting arms are evenly arranged along the circumferential direction of the main body.

10. The electromagnetic shielding shell according to claim 1, wherein the connecting body includes a first connecting body and a second connecting body respectively located on two opposite sides of the main body, and the elastic arms include a plurality of first elastic arms and a plurality of second elastic arms; an end of each of the first elastic arms is connected to the main body, and the other end of each of the first elastic arms is connected to the first connecting body; an end of each of the second elastic arms is connected to the main body, and the other end of each of the second elastic arms is connected to the second connecting body.

11. The electromagnetic shielding shell according to claim 10, wherein the second connecting body is provided with multiple second connecting bodies, and the multiple second connecting bodies are distributed around the axial direction of the main body, a gap is formed between two adjacent second connecting bodies, and a plurality of second elastic arms are arranged between each of the second connecting bodies and the main body.

12. The electromagnetic shielding shell according to claim 1, wherein the main body, the elastic arms and the connecting body are arranged in sequence along the axial direction of the main body.

13. A high-voltage connector, comprising:
- a connector housing; and
- an electromagnetic shielding shell, comprising:
  - a main body;
  - a connecting body having a first connecting body and a second connecting body respectively located on two opposite sides of the main body; and
  - a plurality of first elastic arms, arranged at intervals between the main body and the first connecting body;
  - a plurality of second elastic arms, arranged at intervals between the main body and the second connecting body;
- wherein an end of each of the first elastic arms is connected to the main body, and the other end of each of the first elastic arms is connected to the first connecting body, an end of each of the second elastic arms is connected to the main body, and the other end of each of the second elastic arms is connected to the second connecting body, each of the first elastic arms and the second elastic arms is provided with a protrusion protruding in a radial direction, and the protrusion is configured for electrically contacting a shielding member of a mating connector;
- wherein the electromagnetic shielding shell is arranged inside the connector housing; and the connecting body is arranged at a mating end of a mating connector.

14. An electromagnetic shielding shell for a high-voltage connector, comprising:
- a main body;
- a connecting body having a first connecting body and a second connecting body respectively located on two opposite sides of the main body; and
- a plurality of first elastic arms, arranged at intervals between the main body and the first connecting body, an end of each of the first elastic arms is connected to the main body, the other end of each of the first elastic arms is connected to the first connecting body;

the second connecting body is provided with multiple second connecting bodies, the multiple second connecting bodies are distributed around the axial direction of the main body, a gap is formed between two adjacent second connecting bodies, a plurality of second elastic arms are arranged between each of the second connecting bodies and the main body;

an end of each of the second elastic arms is connected to the main body, the other end of each of the second elastic arms is connected to a respective second connecting body of the multiple connecting bodies;

each of the elastic arms is provided with a protrusion protruding in a radial direction, and the protrusion is configured for electrically contacting a shielding member of a mating connector.

* * * * *